United States Patent [19]
McDaniel

[11] Patent Number: 6,039,203
[45] Date of Patent: Mar. 21, 2000

[54] COMBINATION TOOL BOX AND FUEL TANK

[76] Inventor: Michael E. McDaniel, 4 Remington, Lewisville, Tex. 75067

[21] Appl. No.: 08/722,451

[22] Filed: Oct. 10, 1996

[51] Int. Cl.[7] .................................................. B65D 85/00
[52] U.S. Cl. ........................... 220/562; 224/403; 224/404
[58] Field of Search .................................. 220/4.14, 500, 220/562, 564, 23.87; 224/403, 404

[56] References Cited

U.S. PATENT DOCUMENTS

| | | | |
|---|---|---|---|
| 1,309,526 | 7/1919 | Kahn | 220/4.14 X |
| 1,452,789 | 4/1923 | Carek | 220/562 |
| 1,466,175 | 8/1923 | Kramer | 220/562 |
| 2,271,660 | 2/1942 | Norbom | 220/562 |
| 3,854,621 | 12/1974 | Parry | 224/404 X |
| 3,940,009 | 2/1976 | Szeles | 220/564 |
| 4,967,944 | 11/1990 | Waters | 224/404 |
| 5,299,722 | 4/1994 | Cheney | 224/404 |

*Primary Examiner*—Steven Pollard
*Attorney, Agent, or Firm*—John E. Vandigriff

[57] ABSTRACT

The invention is combination pressurized fuel tank/tool box for a vehicle. A single container has a first compartment in said container for holding a pressurized fuel, a second compartment in said container holds tools, and a recessed area used for mounting an inlet valve and gage for indicating the amount of pressurized fuel in the first compartment. The combination can be one single container or, the pressurized fuel tank may be mounted inside the container.

13 Claims, 4 Drawing Sheets

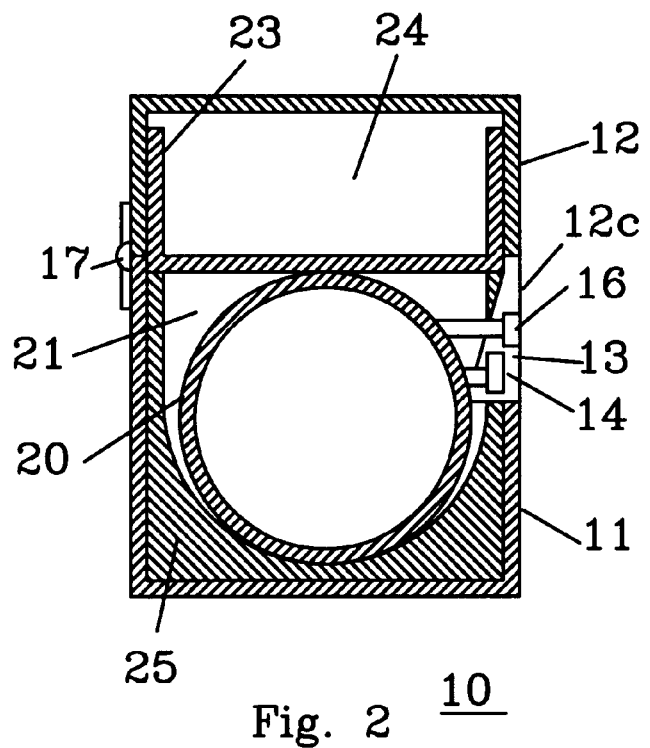
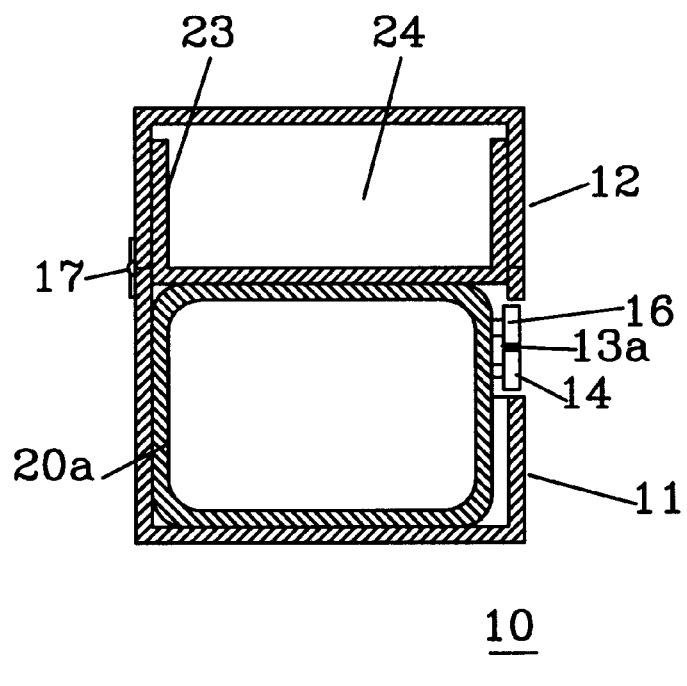

COMBINATION TOOL BOX AND FUEL TANK

FIELD OF THE INVENTION

This invention relates to fuel tanks utilizing pressurized fuels, and tool boxes useful for pickup truck, and more particularly to a combination of a fuel tank and tool box for motor vehicles.

BACKGROUND OF THE INVENTION

Pickup trucks and other vehicles are sometimes adapted to use pressurized fuels such as propane or natural gas. Fleet vehicles have also been adapted for pressurized fuels. The fuel tanks for these gases are mounted in the bed of the pickup truck where a tool box is normally mounted. If a tool box and fuel tank are both used, then a large portion of the truck bed is used allowing very little room for carrying other objects in the truck bed.

Pressured fuel tanks have to be protected, especially the input aperture and pressure and fuel indicator gages to prevent damage to them from other objects carried in the truck. Thus the fuel tank and associated inlets and gages need to be protected.

SUMMARY OF THE INVENTION

The invention is a combination pressurized fuel tank/tool container for a vehicle. A container has a first compartment in said container for holding a pressurized fuel, a second compartment in said container holds tools, and a recessed area is used for mounting an inlet valve and gage for indicating the amount of pressurized fuel in the first compartment. The combination can be one single container or, a pressurized fuel tank may be mounted inside the container. Similarly, multiple pressurized containers may be used.

BRIEF DESCRIPTION OF THE DRAWINGS

FIG. 2 is a cross sectional view of the fuel tank/tool box of FIG. 1 showing a cylindrical fuel tank;

FIG. 3 is a cross sectional view showing a rectangular fuel tank;

DESCRIPTION OF A PREFERRED EMBODIMENT

Figure 1:
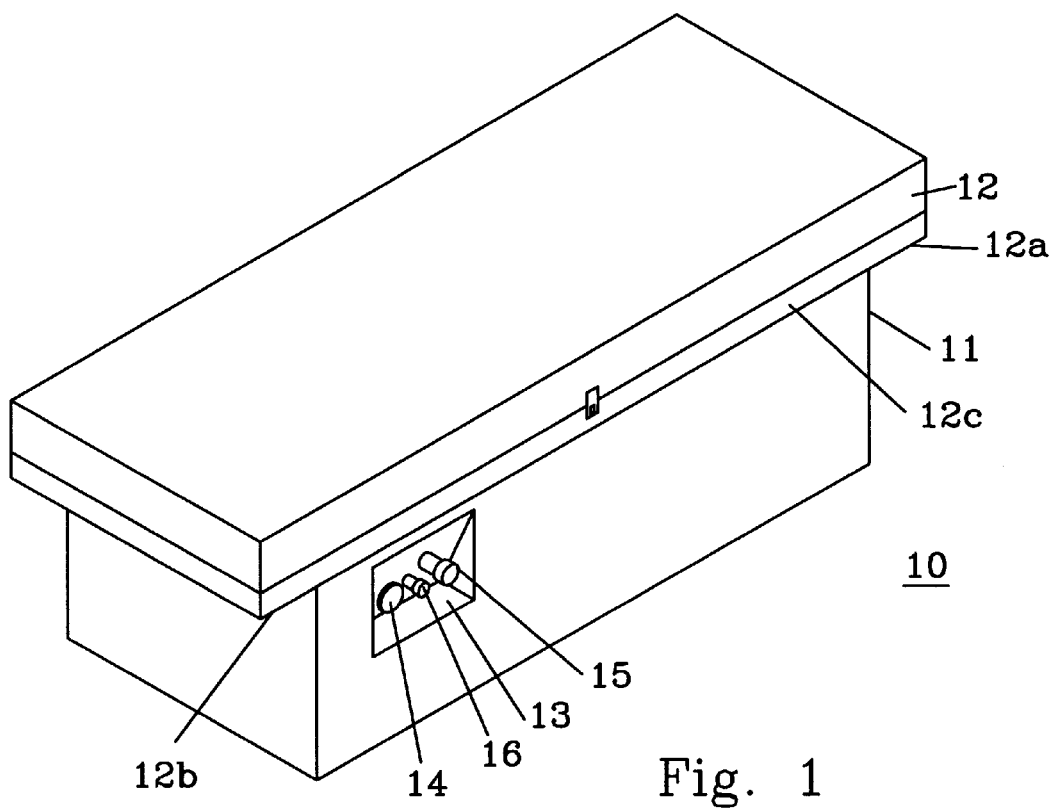
FIG. 1 is an isometric illustration of a combination fuel tank and tool box.

FIG. 1 shows an isometric view of a combination fuel tank and tool box 10. Combination 10 includes a base container 11 and a lid 12. A recessed opening 13 has mounted therein, for example, a fuel gage 14, a valve 16 for controlling the flow of fuel, and a fuel inlet 15 through which fuel is pumped into the fuel tank. Combination fuel tank/tool box 10 is configured to be mounted in a pickup truck in the truck bed behind the cab where a tool box is normally mounted with the ends 12a and 12b of lid base 12c extending over the sides of the truck bed. However, combination fuel tank/tool box 10 may be mounted along either side of the truck bed, and may have ends that do not over-hang.

FIG. 2 is a cross-sectional view of the combination fuel tank/tool box 11 of FIG. 1. In FIG. 2, fuel tank 20 is mounted in opening 21 and on baffle 25 that is configured to match the contour of the outside of fuel tank 22 to prevent its movement within base container 11. Top 12 is secured to base 11 by hinge 17. Mounted over fuel tank 20 is tool tray 23, proving an area 24 in which to store tools and other objects. Gage 14 and valve 16 are recessed, for example, in opening 13 to protect them from damage from objects in the truck bed.

FIG. 3 is a modification of FIG. 2 wherein tank 20a is of a rectangular cross-section to provide a lower vertical profile for fuel tank and tool box 10. Tank 20a is configured to mounted inside of base 11 with the gage 14 and valve 16 recessed back in area 13a so that they do not extend beyond the wall of base 11. This configuration of tank 20a allows a lower profile for smaller pickup trucks, or alternatively, allows a bigger fuel tank or tool compartment.

Figure 4:
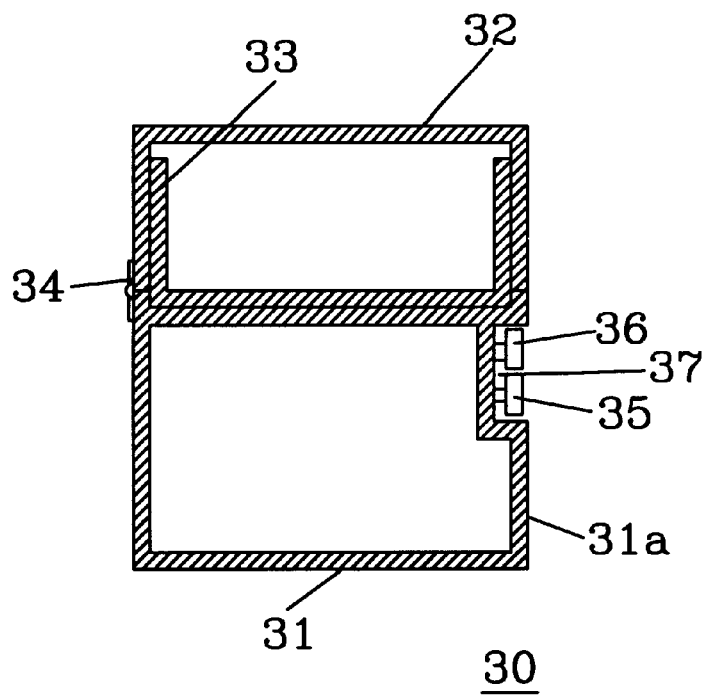
FIG. 4 is a cross-sectional view of a combination fuel tank/tool box where the fuel tank is integral with the overall structure.

FIG. 4 illustrates a fuel tank/tool box combination 30 wherein fuel tank 31 is not a separate tank but an integral part of the fuel tank/tool box combination. Tank 31 has a recess 37 in wall 31a in which gage 35 and valve 36 are positioned. Lid 32 is hinged to tank 31 by hinge 34. Tool tray 33 resides under lid 32 on top of fuel tank 31. In the configuration of FIG. 4, either the fuel tank 31, or tool box portion (32,33) can be made of a desirable size to be mounted in full size or small pickup trucks.

Figure 5:
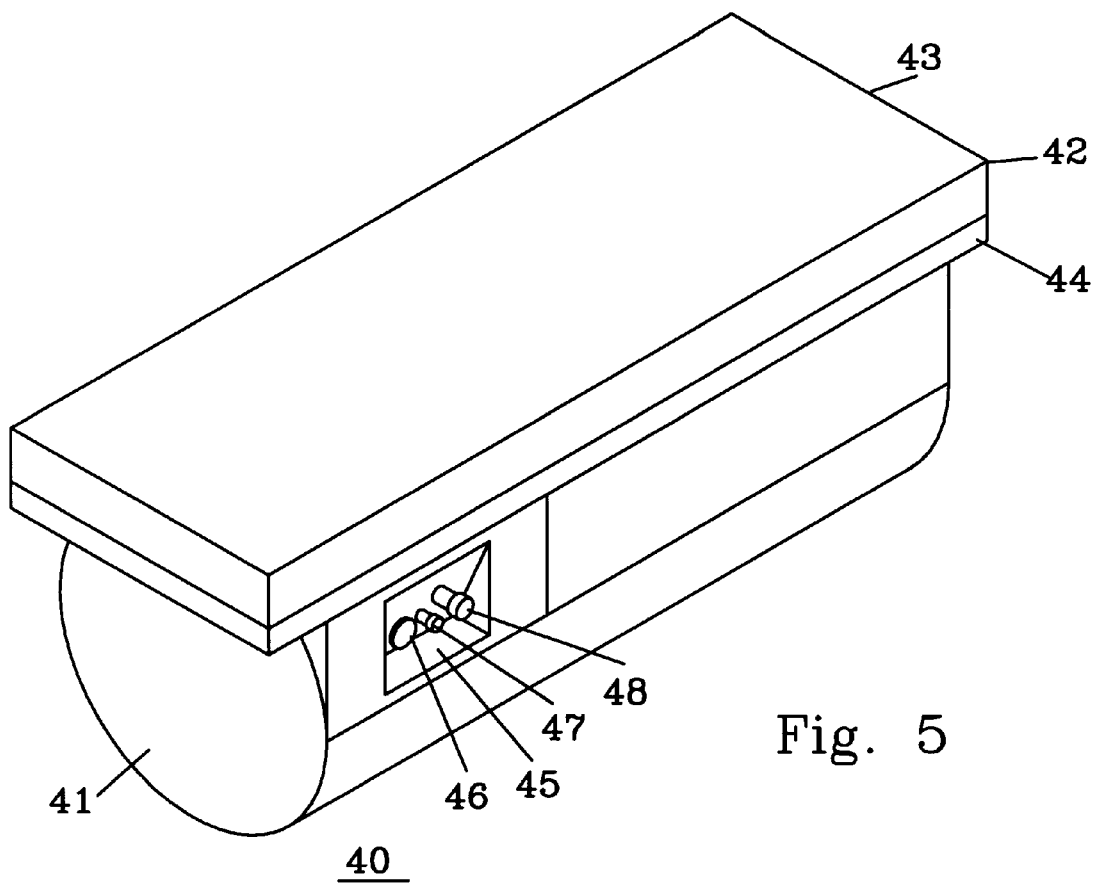
FIG. 5 is a second embodiment of a combination fuel tank and tool box.

FIG. 5 is an isometric illustration of a fuel tank/tool box 40 that has been constructed using an existing fuel tank 41 and a tool box 42 has been mounted on top of the fuel tank 41. Tool box 42 is secured to fuel tank 41 providing a tool tray 49 and a small storage area under tray 49 on top of tank 42.

Figure 6:
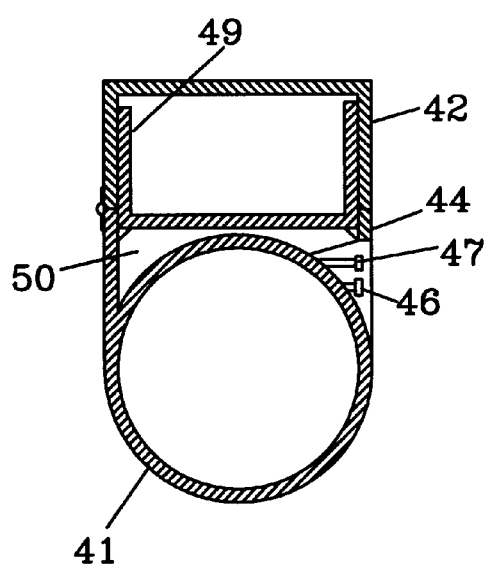
FIG. 6 is a cross-sectional view of the fuel tank/tool box of FIG. 5.

FIG. 6 is a cross-sectional view of the fuel tank/tool box 40 showing tool box 42 mounted on tank 41 and forming an integral part thereof. Gage 47 and valve 47 are recessed in opening 45. Tool box 42 has a lid 43 hinged to lower part 44 of tool box 42.

Figure 7:
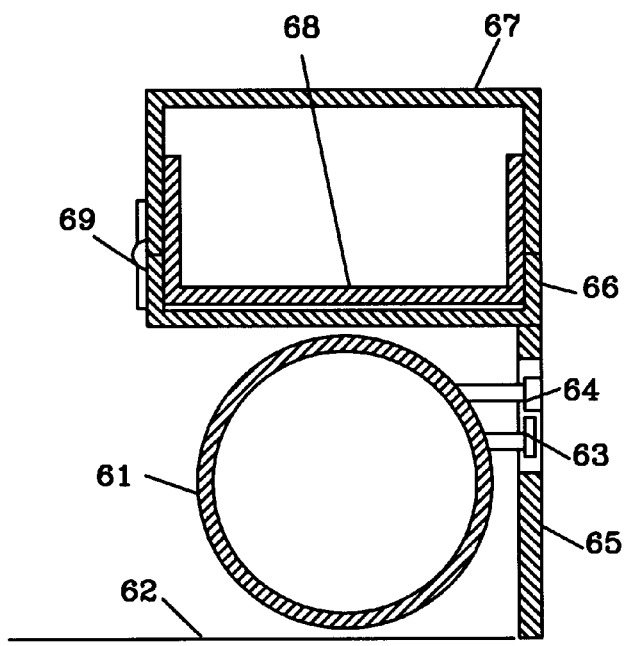
FIG. 7 is a cross-sectional view of a fuel tank with a tool box cover.

FIG. 7 shows an embodiment where a fuel tank/tool box combination 60 utilizes a fuel tank 61 mounted on a mounting surface 62 and with fuel gage/inlet 63,64 located in an opening 70 in a wall 65. Wall 65 also supports a tool compartment made up of base 66 and lid 67 hinged to base 66 with hinge 69. Tool compartment 68 inside base 66 and lid 67.

Tool box base 66 is not shown supported by fuel tank 61, but may be supported by the fuel tank or by wall 65 or a combination thereof.

Although each of the illustrated embodiments shows only one fuel tank, there may be one or more fuel tanks used in combination with storage compartment.

What is claimed is:

1. A combination pressurized fuel tank/tool box for a vehicle, comprising:
    a first container;
    a second independent container in said first container for holding a pressurized fuel, and having inlet and outlet valves;
    a compartment container;
    at least one tray mounted in said compartment for holding tools; and
    a recessed area in said first container for providing protective access to said inlet and outlet valves on said second container.

2. The combination according to claim 1, wherein said recessed area includes a gage for indicating the amount of pressurized fuel in the second container.

3. The combination according to claim 1, wherein said first compartment includes a removable tray.

4. The combination according to claim 1, wherein said first container has external walls, and said second container includes walls internal to said first container.

5. The combination according to claim 1, wherein said first container has a lid which opens to provide access to the compartment.

6. The combination according to claim 1, wherein said first container has a baffle therein and said second container is a removable pressurized fuel tank.

7. A combination pressurized fuel tank/tool storage container box for a vehicle, comprising:

a first container;

a second independent container mounted in said first container, said second container for holding a pressurized fuel, and having inlet and outlet valves mounted thereon;

a compartment in said first container, above said second container, for holding tools; and a recessed area in said first container into which extend said inlet and outlet valves.

8. The combination according to claim 7, wherein said recessed area includes a gage for indicating the amount of pressurized fuel in the first compartment.

9. The combination to claim 7, wherein said, compartment, in said first container, includes at least one tray.

10. The combination according to claim 7, wherein said first container has external walls, and said second container includes walls internal to said first container.

11. The combination according to claim 7, wherein said first container has a lid which opens to provide access to the compartment.

12. The combination according to claim 7, wherein said first container has a baffle therein for mounting a removable second pressurized fuel tank container.

13. A combination pressurized fuel tank/tool storage container box for a vehicle, comprising:

a first compartment for holding pressurized fuel, a pair of walls extending up from and attached to two sides of the first compartment, and a second pair of walls extend up from and attached to two ends of said first compartment, said first and second pairs of walls forming a second compartment; and a cover for enclosing the top of said second compartment, and a portion of said first compartment forming a bottom of said second compartment.

\* \* \* \* \*